Figure 1:
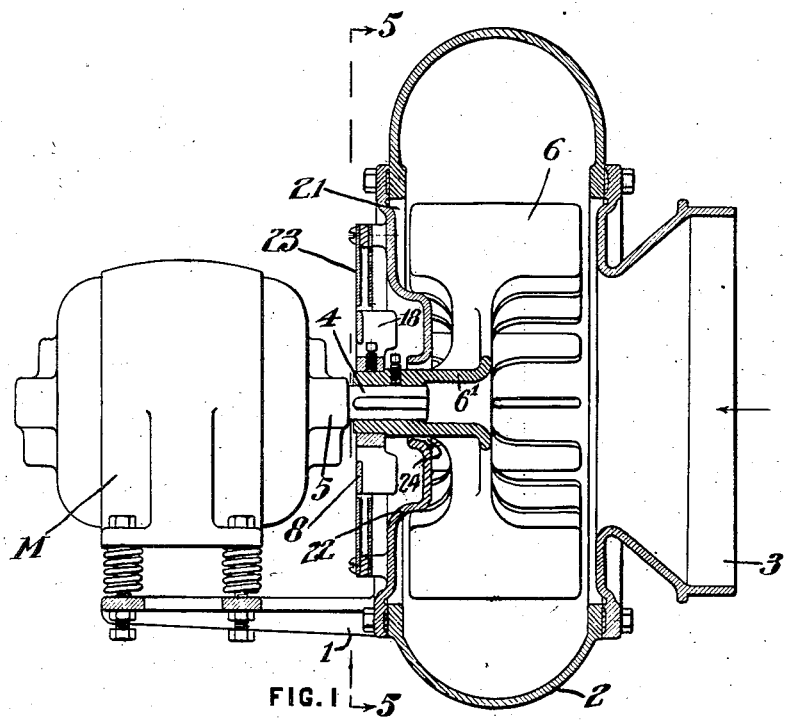

July 10, 1934.  J. B. PHILLIPS  1,966,262
BLOWER
Filed Sept. 22, 1928  2 Sheets-Sheet 1

Inventor
James B. Phillips
By Attorney

Patented July 10, 1934

1,966,262

UNITED STATES PATENT OFFICE 1,966,262

BLOWER

James B. Phillips, Cape Elizabeth, Maine, assignor to The Maine Electric Company, Portland, Maine, a corporation of Maine Application September 22, 1928, Serial No. 307,642

5 Claims. (Cl. 230—209)

In the concept of my present invention I am dealing with problems involving blowers and particularly those employed in high temperature exhaustion.

More specifically my invention contemplates draft induction in which the blower draws gases at high temperature, as for example, through the flues of a boiler to aid or control the stack draft.

Here as in many other places the impelling fan is exposed to high temperatures and those installations convenient to such apparatus are subjected to extreme conditions under which certain parts are imperiled as to life and operative efficiency as in the instance illustrated in the accompanying drawing, the utilization of a motor in close proximity to the blower.

In such an installation the shaft bearing of the motor which must for practical reasons be closely adjacent to the hot blower fan and so positioned, is liable to burn out. In fact, such installations have usually heretofore been equipped with water cooling systems at great expense to prevent the disastrous results of axial radiation along the shaft. By my present invention I am able to deal with this problem on a simple and inexpensive basis.

Coupled with this difficulty has been a related but distinct problem. Rigidly connected motors for such blowers induce vibrations wihch are undesirable and, in the case of domestic installation, are extremely annoying.

There was apparently an absolute necessity for rigidity in the mounting of motor relative to blower as a simple matter of insurance of alignment. My concept provides, however, for a sufficient freedom in alignment to permit of a spring suspension which therefore forms a combinative part of my ultimate concept.

These and other features will be discussed more in detail in connection with the drawings in which I have set forth a typical structure as illustrative of both general principles and desirable detail.

Throughout the specification and drawings like reference characters indicate corresponding parts and in the drawings:

Fig. 1 is an elevation of a unit in partial section.

Figure 2:
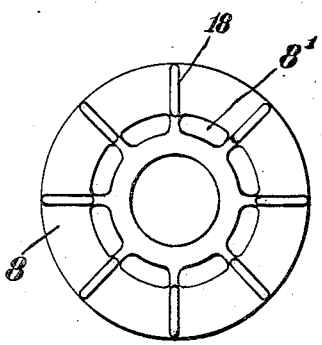

Fig. 2 a face view of the shaft cooling fan.

Figure 3:
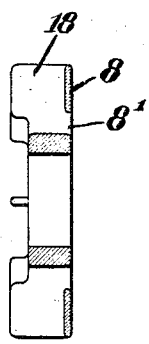

Fig. 3 a sectional view thereof.

Figure 4:
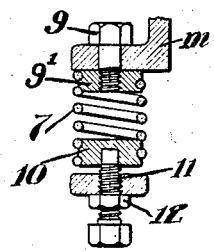

Fig. 4 a detail of the motor spring suspension.

Figure 5:
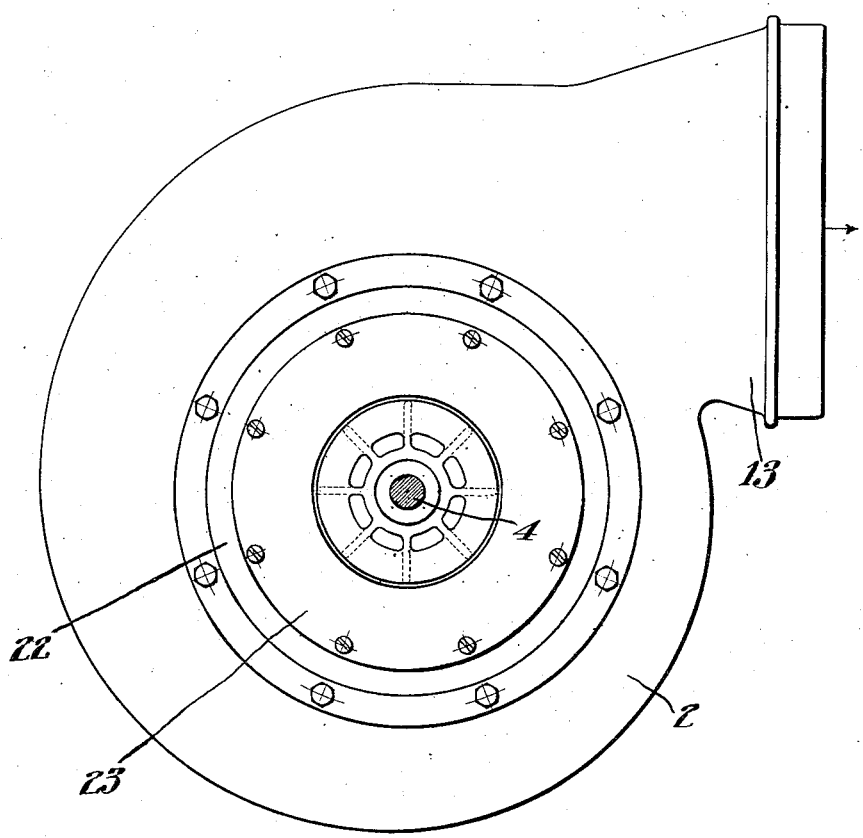

Fig. 5 is a sectional view on the line 5—5, Fig. 1.

In Figs. 1 to 5 inclusive I have illustrated the fan or draft apparatus and to this I refer first for the better understanding of my combination as a whole.

The unit proper comprises a blower casing 2 which is of usual design having an intake 3 and an exhaust 13.

The casing 2 is apertured at its draft axis as at 21 having an inner annular cupped flange 22 opening outwardly. At the outer edge or lip of the cup I attach a pair of segmental plate sets 23. These are semi-annular plates set in spaced relation to provide for an annular planal ventilation surrounding the fan shaft which passes freely through the opening 24 centrally of the cup. Combined with such a casing so apertured I provide a motor unit consisting essentially of a motor M which in ordinary construction has a shaft 4 carried in bearings, the external or lateral bearing being indicated as 5. This bearing is the critical element in such an installation. As a bearing it is necessarily in a most exposed position. It is closely adjacent to and in immediate conductive relation with the highly heated fan member 6 which as an impeller is exposed to the highest temperatures involved. Herein lay the trouble as the heat from the hot air current in its passage through the fan 6 reacted directly in the line of the shaft axis to overheat the bearing 5 and destroy its efficiency.

The elimination of gas leakage from the blower 2 through the opening 24 is prevented by the pressure of the air caused by the cooling fan 18. The plates 23 may be mounted on an annular ring around the stepped in portion of the casing 2. With this construction the air effectively seals the openings 24. It is also obvious that this same result may be achieved by adapting the fan 18 to direct a stream of air from the outside against the openings 24 and spaces may be left between the plate 23 and the casing 22 to facilitate circulation of the air.

Such was the problem which as stated before had previously only been successfully dealt with by water cooling or like expensive means. My concept removes these mechanical burdens. I simply utilize the fan entry opening as an element of cooling.

I mount on the motor shaft 4 a disc 8. This disc 8 has free running fit in the central aperture of the cooling plates 23 within tolerance hereinafter described, but effectually covering the aperture.

The cupped portion 22 provides within the annular plates 23 a circular chamber which is completed by the disc 8. This disc is provided with blades or fins 18 which serve the double function of creating a draft within this annular cup portion about the shaft 4 and hub 6¹ and also acts as radiating fins for the dispersion of heat conducted from the fan 6 through the hub 6¹. In this way an annular cooling space is provided between the hot blower fan 6 and the shaft bearing 5 in which also takes place the radiation from the disc 8 and its blades 18 which are mounted on the outer end of the hub 6¹. This zone therefore constitutes a thermal barrier between the heat within the casing 2 and particularly the heat of the fan 6 and the bearing 5 which as shown is a motor bearing but might represent any other vital bearing or part necessarily disposed adjacent the blower casing 2.

The motor M has a base $m$ which is mounted through springs 7 on the base plate 1. The springs 7 are attached to the motor base $m$ at their top by a block 8 held by a screw 9¹. At the lower end is a block 10 adjustably supported by a threaded stud 11 which is tapped through the flange of the base 1 and set by a lock nut 12 so that the spring support of the motor can be carefully adjusted. This spring support takes up all the vibration of the motor and the springs are so adjusted as to their strength as not to exceed the shaft clearance in its opening in the cup plate 22 or the clearance of the blower disc 8 in its opening in the ventilating plates 23.

This feature of my invention may be embodied in any type of blower or like device and may be variously designed to meet the requirements of the installation in which it is used.

The motor support as hereinbefore described may also be varied and while these two features are capable of independent use, their combination is important as the clearance of the rotating parts in the casing necessary on account of the spring support of the motor is taken care of by the cooling blower 8 which acts not only to protect the bearing 5 but prevents any escape of the hot air or gases around the rotating parts and through the space necessary for clearance.

The embodiment shown is a practical and efficient one but it is to be understood as illustrative and not as limiting. In the general combination any type of boiler may have its draft improved by such a combination as I have indicated.

What I therefore claim and desire to secure by Letters Patent is:—

1. In an exhaust blower, a casing having an opening therein, a motor inclusive of a shaft extending through said opening into the casing, said opening being of greater diameter than said shaft to permit relative lateral movement between the casing and said motor and shaft, whereby the motor may be yieldably mounted, a fan on said shaft within said casing, means outside of the casing between the motor and the casing operable by the motor to create a cooling draft of air over a bearing of the motor towards the opening in said casing and a plate mounted on said casing apertured to permit access of air to said means whereby to provide at that point a pressure preventing escape of air or gases from the casing through said opening.

2. In an exhaust blower, a casing, a shaft extending through a side of said casing into the latter, a fan on said shaft within the casing, a bearing for said shaft outside of the casing, a plate surrounding said shaft outside of the casing in spaced relation to the side thereof cooperating with the casing side to provide a chamber for a cooling fan, and a cooling fan on said shaft within said chamber, said fan comprising a hub, blades, and a ring connecting said blades and spaced at its inner edge from said hub and disposed at its outer edge closely adjacent to the inner edge of said plate, whereby said cooling fan operates to create a cooling draft of air over said bearing towards said casing.

3. In an exhaust blower, a casing having an opening therein, a motor inclusive of a shaft extending through said opening into the casing, said opening being of greater diameter than said shaft to prevent relative lateral movement between the casing and said motor and shaft whereby the motor may be yieldably mounted, and means outside of the casing between the motor and the casing operable by the motor to direct a cooling draft of air toward the opening in said casing, an apertured plate surrounding said means defining with said casing, a pressure chamber, whereby to provide at that point a pressure preventing escape of air or gases from the casing through said opening.

4. In an exhaust blower, a casing having an opening therein, a motor, a shaft of substantially less diameter than said opening in said casing extending from said motor through said opening into said casing, a fan on said shaft outside of the casing designed to create a draft of air and direct the same towards the opening in said casing, and means mounted on said casing adjacent said fan permitting said draft to create a pressure at said opening which prevents escape of hot air or gases from the casing through the opening.

5. In an exhaust blower, a casing, a motor, said casing being stepped inwardly to provide a chamber recess, a plate on said chamber recess, a drive shaft from said motor, said plate and said casing having openings through which said shaft extends, said openings being of greater diameter than said shaft so that the motor may be yieldably mounted, and means on said shaft between said casing and said plate operable by said motor adapted to direct a current of air towards the shaft openings so as to maintain in said chamber a pressure preventing escape of air or gases from the casing through said shaft openings.

JAMES B. PHILLIPS.